United States Patent Office 2,941,014
Patented June 14, 1960

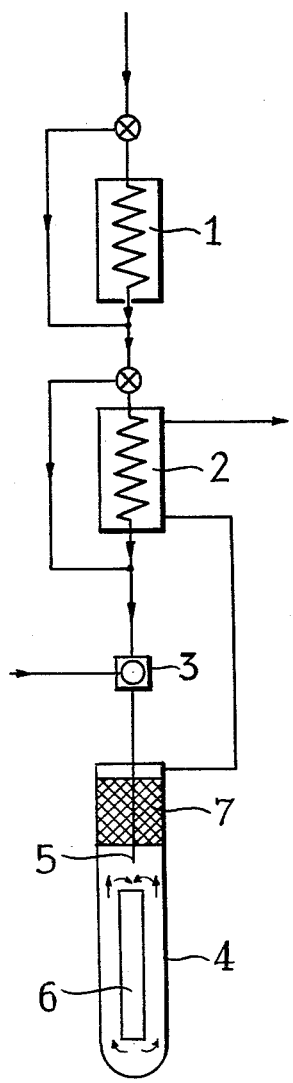

2,941,014

MANUFACTURE OF ALKYL CHLORINATION PRODUCTS

Friedrich Rothweiler and Paul Greif, Hofheim, and Fritz Eggert, Frankfurt, Germany, assignors to Farbwerke Hoechst Aktiengesellschaft vormals Meister Lucius & Brüning, Frankfurt am Main, Germany, a corporation of Germany Filed Dec. 28, 1955, Ser. No. 555,987

Claims priority, application Germany Aug. 6, 1954

12 Claims. (Cl. 260—662)

This invention relates to the manufacture of alkyl chlorination products of at least 2 carbon atoms.

Bios final report No. 851 discloses the chlorination of methane at elevated temperatures in a heated reaction chamber provided with internal circulation means.

This process, however, shows the disadvantage that the proportions of the resulting methane chlorination products can be varied only within very narrow limits, that the loading capacity of the reaction vessel is dependent on the heatable surface thereof and that it is not possible to go beyond a limited size of the reaction vessel as its dimensions depend upon the proportion of the heatable surface to the reaction volume.

In the case of the known reaction vessel of about 5 m.³ of total reaction space (reaction chamber and auxiliary reaction chamber) the relative proportions of the reaction products may be varied within very narrow limits only, as practically only mixtures of fresh gases containing about 16% by volume to about 20% by volume of chlorine can be treated.

Fresh gas mixtures of a lower chlorine content, i.e. with an increasing excess of methane, which would otherwise give an increase of the proportion of the methane chlorination products of lower chlorine content, cannot be treated in this system, as the amount of heat which is necessary in order to reach the starting temperature of more than 320° C. cannot by introduced from outside to the reaction chamber, as in such an event the high temperature of the walls would effect the thermal decomposition of the methane chlorination products.

On the other hand, fresh gas mixtures of a higher chlorine content which, according to the law of mass action, would otherwise lead to an increase of the proportion of the methane chlorination products of high chlorine content, likewise cannot be treated as the reaction heat, due to the insufficient "circulation ratio" within the reaction chamber, viz. of only 2:1 to 3:1, would cause an inadmissible rise of temperature and, consequently, a thermal decomposition of the methane chlorination products accompanied by the splitting off of carbon.

In this connection "circulation" means that the gas in the reaction chamber is continuously thoroughly mixed by an appropriate device, for instance a conduit provided with a jet, in a similar manner to the use of a stirrer in the case of reactions occurring in solutions. Thereby, the gas already present in the reaction chamber is mixed, in a definite proportion, with fresh gas. This proportion is called the "circulation ratio."

Moreover in the cited process the reaction chamber can only be charged in a restricted manner. The additionally needed amount of heat for maintaining the reaction is provided by heating the reaction chamber externally, although the reaction itself is exothermic and yields 1000 kilogram-calories of heat per m.³ of reacted chlorine. Of this amount of heat which, in the course of the reaction, is taken up by the total gas quantity (fresh gas and circulation gas) only $2.5/(2.5+1)=2.5/3.5=71.4\%$ is transferred to the fresh gas mixture in the conduit, if the internal circulation ratio is, for instance, 2.5:1, whereas 28.6% leaves the reaction chamber in the reaction gases. When a starting temperature higher than 320° C. is to be reached behind the conduit, about 10% to about 15% of the heat set free by the reaction must be supplied to the reaction chamber by external heating. Consequently, the course of the reaction and the loading capacity of the reaction chamber are directly dependent on the heatable surface. If, however, an attempt is made still further to increase the loading capacity of the reaction chamber, the supply of heat through the wall of the reaction vessel must also be increased. In the case of a given area of surface of the reaction vessel this increase in the heat supply would lead to wall temperatures elevated to a degree which would cause a thermal decomposition of the chloromethanes formed, accompanied by the splitting off of carbon.

As the ratio of the surface of the reaction chamber to its volume diminishes with increasing size of the reaction chamber, the possibility of enlarging the reaction chamber is limited.

All the difficulties mentioned above for the chlorination of methane also arise if hydrocarbons of 2 or more carbon atoms are to be chlorinated in said reaction chamber.

This application is in part a continuation of application Ser. No. 525,862, filed August 2, 1955, now abandoned.

In the copending application Ser. No. 441,874, filed July 7, 1954, now abandoned, for "Process for the Manufacture of Methane Chlorination Products," it is described to prepare methane chlorination products by reacting in an adiabatic manner mixtures of chlorine with methane or with methyl chloride, methylene chloride or chloroform or with mixtures thereof, if desired in the presence of an inert gas, at an elevated temperature below the decomposition temperature of the methane chlorination products. By "adiabatic reaction" is meant that during the exothermic reaction no heat is supplied to the reaction gases by heating or withdrawn therefrom by cooling.

Now, we have found that alkyl chlorination products which contain at least two carbon atoms can be prepared by reacting mixtures of chlorine with saturated aliphatic hydrocarbons or with chlorinated aliphatic hydrocarbons containing at least 2 carbon atoms, such as ethane, ethyl chloride, ethylene chloride or mixtures thereof, propane or chlorinated propanes, n-butane, iso-butane, mixtures of n- and/or iso-butanes and chlorinated butanes, mono-unsaturated hydrocarbons such as ethylene, propylene or butylenes, or vinyl chloride, vinylidene chloride etc., if desired in the presence of an inert gas, at a temperature above the starting temperature and below the decomposition temperature of the alkyl chlorination products and generally in the absence of catalysts, in a reaction chamber which allows of carrying out the chlorination—which is an exothermic reaction—without any substantial transfer of heat through the walls of the reaction chamber. This means that the reacting gases are neither cooled nor heated from outside during the reaction. The reaction according to the present invention, therefore, requires a well heat-insulated reaction chamber. Any heat losses which are still caused by radiation are of no importance in comparison with the heat quantities present in the reaction chamber. The use of catalysts, though possible, does not offer any advantages.

The process of this invention compared with the known one, offers the following advantages:

The relative proportions of the aliphatic hydrocarbon chlorination products formed can be varied within wide limits and the loading capacity of the reaction chamber is independent of its surface. Furthermore, the reaction chamber can be enlarged to any desired extent as, according to the present process, the course of the reaction in the reaction chamber becomes independent of external heating and, thus, of the heatable surface of the reaction chamber.

It is, of course, only possible to carry out the reaction with gaseous mixtures which have a chlorine content which is outside the explosive range of such mixtures. The proportions of the resulting alkyl chlorination products are determined by the law of mass action. Fresh gas mixtures with a substantial excess of the starting material, for instance ethane, as compared with chlorine, preferably yield a mixture of hydrocarbons the major part of which is a chlorinated hydrocarbon containing 1 chlorine atom more than the starting product, in this example ethyl chloride, with a reduced excess of starting material whereas fresh gas mixtures form large amounts of the higher chlorinated ethane chlorination products. By adding higher chloro-alkanes, e.g. chloro-ethanes and/or an inert gas—singly or together—to the fresh gas mixture, the relative proportions of the chlorination products formed can also be varied according to the law of mass action.

When a definite number of chlorine atoms is to be introduced into the molecule, it is of advantage to cool the gas mixture containing the chlorination products, which have primarily been formed, to such a degree that the portions which are more difficultly volatile are condensed and then to reintroduce the non-condensed products into the reaction chamber. The better the condensable products, for example alkyl monochlorides, are separated from the gas mixture obtained during the reaction, the more homogeneous is the reaction product.

In view of the specific performance of the reaction it is furthermore possible to render its course independent of the heating of the reaction chamber. This result is attained by increasing the ratio of the internal circulation (proportion of circulating gas to fresh gas entering) higher than 3:1 and by selecting an appropriate inlet temperature of the fresh gas mixture. By dispensing with heating of the reaction chamber its loading capacity becomes independent of its surface.

Irrespective of the amounts of gases fed to the reaction chamber, the above measures allow of maintaining, during the reaction, temperatures exceeding the starting temperature of the reaction, i.e. higher than about 250 to about 320° C., and remaining below the decomposition temperatures of the alkyl chlorination products, i.e. below about 420° C.–500° C. The course of the reaction within the range of these temperatures is guaranteed. It is to be noted that the starting temperature is different for each substance and is, in general, between about 250° C. and 320° C.

A formation of carbon caused by the thermal decomposition of the reaction products cannot take place as even local superheating is completely excluded by dispensing with the external heating of the reaction chamber and by the large internal circulation ratio.

By increasing the internal circulation ratio, e.g. to 5:1, the process of the present invention permits of transferring to the fresh gas $5/(5+1)=5/6=83.3\%$ of the amount of heat liberated by the reaction, whereas only 16.7% leaves the reaction chamber in the reaction gases. In this manner it is possible in the conduit to exceed the starting temperature without additional external heating of the reaction chamber, if, for instance, a fresh gas mixture containing 16% by volume to 17% by volume of chlorine is introduced into the reaction chamber at "room temperature," by which term, here and below, a temperature of about 20° C. is to be understood. The fresh gas mixtures of gaseous alkyl hydrocarbons containing a higher percentage of chlorine advantageously have an inlet temperature below room temperature down to about —20° C. and those of a lower percentage of chlorine advantageously have an inlet temperature above room temperature. The fresh gas mixtures of such starting materials as are liquid at room temperature are, from the beginning, either heated to temperatures above the boiling point of these compounds or a part or the total amount of these compounds is sprayed—if desired with application of pressure—into the circulation system in a finely dispersed liquid state together with chlorine. The chlorine may in this case likewise be introduced at a temperature below the boiling point of said starting materials and diluted by an inert gas. The fresh gas mixtures are then circulated in the usual manner together with the reacted gas which has a temperature corresponding to the temperature of reaction.

The present process can be carried out as follows, using an apparatus as illustrated diagrammatically in the accompanying drawing:

Referring to the drawing, an aliphatic hydrocarbon or chlorinated hydrocarbon or mixtures thereof to which also an inert gas may be added is passed into a preheater 1, and from there to a heat exchanger 2. In a mixing device 3 chlorine is added to the organic starting material, and this fresh gas mixture is passed to the reaction chamber 4.

By means of a circulation device, consisting for instance of a jet 5 and a conduit 6, reacted gas is taken in at the temperature of reaction and mixed in the conduit with the fresh gas mixture in a proportion higher than 3:1. By means of the reacted gases drawn from the reaction chamber into the circulation device at a reaction temperature of about 300° C. to about 420° C., the fresh gas mixture, mixed therewith in the conduit, is heated to a temperature higher than the starting temperature. The heat set free during the reaction then raises the temperature of the mixed gas to the final temperature of the reaction amounting to about 300° C. to about 420° C. The reaction of the chlorine is nearly complete. The residual chlorine is, if desired, finally reacted in an auxiliary reaction chamber 7, only an insignificant proportion thereof being left unreacted, so that the mixture of the final reaction gases contains less than 0.05% by volume of chlorine.

In the heat exchanger 2 the gaseous mixture can transfer its heat to the starting mixture. The preheating need not be restricted to the organic starting material. If desired, all the reactants, including the chlorine, as such or in admixture, can be preheated to any temperature below the starting temperature of the reaction. The said reaction can, however, also be carried out without preheating of the reaction gases or the mixtures of reaction gasees. Of course, it is also possible to effect a preheating only in preheater 1 or only in heat exchanger 2.

For economic reasons it is advantageous to use the heat of the gases leaving the reaction chamber for preheating.

The above described circulation device consists of a jet and a conduit. Its efficiency can be improved by making use of experience gathered in applied aerodynamics. The circulation can also be effected by other means applied in industrial practice.

In the above described system the circulation device consists of a cylindrical jet and a cylindrical conduit. The dimensions are indicated in the following tabulation.

EMBODIMENT I

| | |
|---|---|
| Reaction chamber including auxiliary reaction chamber. | Internal diameter 1200 mm. length 6000 mm. |
| Total capacity | 6.8 m.³ |
| Jet | 100 mm.–40 mm. internal diameter. |
| Conduit | 450 mm.–350 mm. internal diameter, length 3000 mm. |
| Ratio $\frac{\text{cross section of conduit } F}{\text{cross section of jet } f}$ | Higher than 20 up to about 100. |
| Rate of supply of fresh gas mixture | 200 m.³/hr. to 1200 m.³/hr. at least. |
| Circulation ratio measured in a blank test by means of air. | Higher than 3 to about 7. |

With a conduit of an internal diameter of 400 mm. and a length of 3000 mm., a ratio $F/f=$about 37 is preferably chosen, the resulting internal circulation ratio being about 5 and the total quantity of fresh gas fed to the reaction chamber amounting from about 200 m.³/hr. to about 1200 m.³/hr. measured in a blank test by means of air. The quantity of 1200 m.³/hr. of fresh gas can, however, be exceeded by about 50%. The volumes are in cubic metres of gas under normal conditions (pressure 760 mm., 0° C.) here and below.

EMBODIMENT II

| | |
|---|---|
| Reaction chamber including auxiliary reaction chamber. | Internal diameter 1800 mm., length 9000 mm. |
| Total capacity | 23 m.³ |
| Jet | Internal diameter 160 mm.–80 mm. |
| Conduit | Internal diameter 850 mm.–700 mm. |
| Ratio $\frac{\text{cross section of conduit } F}{\text{cross section of jet } f}$ | Higher than 25 up to about 100. |
| Rate of supply of fresh gas mixture | 600 m.³/hr. to 4000 m.³/hr. |
| Circulation ratio measured in a blank test by means of air. | Higher than 3 to about 7. |

With a conduit of an internal diameter of 800 mm. and a length of 6000 mm., a ratio $F/f$ of about 45 is preferably chosen, the resulting ratio of the internal circulation being about 5 and the total quantity of fresh gas fed to the reaction chamber amounting to between about 600 m.³/hr. and about 4000 m.³/hr. measured in a blank test by means of air. The total quantity of fresh gas of 4000 m.³/hr. can, however, be exceeded by about 50%.

The above mentioned figures apply for a slight excess pressure in the reaction chamber amounting from about 1 to about 2 atmospheres (absolute) and for a pressure drop from a few cm. of water to a few m. of water in the jet. If the pressure conditions change, these figures have to be altered. In the indicated quantity ranges the internal circulation ratio is practically constant in the case of the given dimensions.

When designing the circulation device it must be taken into consideration that the effective concentration of chlorine in the reaction chamber diminishes with increasing circulation ratio.

The dimensions of reaction chambers of a smaller or a larger volume than exemplified in Embodiments I and II can be derived from the figures given for the two embodiments.

The method of mixing the fresh gas with the circulation gas in the reaction chamber can in practice be changed by additional installations. Such additional devices can be installed, for instance, in the conduit, in the annular section formed by the conduit and the reaction chamber and also in the lower and the upper parts of the reaction chamber. It may also be advantageous temporarily to heat the reaction chamber externally, for instance when starting and in order to avoid heat losses caused by radiation during interruptions of operation, i.e. to provide for the heat capacity of the reaction vessel itself.

As described above, the reaction chamber can be followed by an auxiliary reaction chamber 7 in which the residual chlorine can be reacted. This auxiliary reaction chamber can be heated and/or be provided with heat-retaining substances which should advantageously be non-porous, for instance flint and porcelain, or with catalytically active filling material. It can be installed inside or outside the main reaction chamber As constructional material for all parts of the reaction chamber, the auxiliary reaction chamber and other parts of the installation which come into contact with the reaction gases, nickel or nickel-containing steels are advantageously used.

As can be seen from the examples below it is possible in the course of the reactions according to the present invention to change, within wide limits, the relative proportions of the reaction products formed by varying the conditions of reaction. This is achieved by selecting an appropriate inlet temperature of the fresh gases, by altering the composition of the fresh gases, particularly as regards their chlorine content and by maintaining a suitable internal circulation ratio.

The following examples illustrate the invention and relate to operations carried out by means of a continuously working circulation apparatus with a reaction chamber according to Embodiment I. For starting the reaction, the reaction chamber is heated up the the starting temperature. This can, for instance, be effected by heating the reaction chamber externally and by causing hot circulation gas to flow through its interior. When the starting temperature is reached, the reaction is started by adding chlorine to the circulation gas containing at least one of the organic materials described above. As soon as the desired temperature in the reaction chamber is reached, the reaction is conducted continuously under the conditions described in the examples.

The following examples serve to illustrate the invention but they are not intended to limit it thereto; the relation between units of weight and units of volume is the same as that between the kilogram and the liter.

Example 1

A mixture of 27% by volume of chlorine and 73% by volume of ethane is reacted at 390° C. The inlet temperature of the fresh gas entering the reaction chamber is +25° C.

The chlorination products formed consist of 87.2% by weight of ethyl chloride and 12.8% by weight of dichlorethanes. The conversion is, as in the following examples, almost complete. Consequently, less than 0.05% of chlorine are contained in the reacted gas mixture.

Example 2

In order to obtain a higher yield of dichlorethanes, the condensation of the chlorination products primarily formed at 390° C. according to Example 1 is carried out at +16° C. and the products which have not been condensed during this process, i.e. chiefly the ethyl chloride, are returned as recycle gas to the reaction chamber where they are reacted once more with chlorine. Fresh ethane is added only pari passu with its consumption. Before the reaction the gas mixture contains 16.5% by volume of chlorine, the rest is recycle gas. The inlet temperature of the fresh gas is about +25° C.

The mixture of the chlorination products formed contains:

| | Percent by weight |
|---|---|
| Ethyl chloride | 18.4 |
| 1.1-dichlorethane | 37.2 |
| 1.2-dichlorethane | 32.6 |
| Higher chlorinated products | 11.8 |

Example 3

A mixture of 9% by volume of chlorine and 91% by volume of propane is reacted at 360° C. The inlet temperature of the fresh gas entering the reaction chamber is +250° C.

The chlorination products formed consist of:

| | Percent by weight |
|---|---|
| Isopropyl chloride | 18.2 |
| n-Propyl chloride | 34.6 |
| 1.2-dichlorpropane | 43.2 |
| 1.2.3-trichloropropane | 4.0 |

Example 4

A mixture of 33% by volume of chlorine and 67% by volume of technically pure butane is reacted at 275° C. The butane is introduced into the reaction chamber at +5° C.

The chlorination products formed consist of 49% by weight of 2-chlorobutane, 24% by weight of 1-chlorobutane, 22% by weight of 2,3-dichlorobutane and 5% by weight of 1,2,3-trichlorobutane.

Example 5

A mixture of 60% by volume of ethylene, containing about 4% by volume of ethane, and 40% by volume of chlorine is reacted at 345° C. The inlet temperature of the fresh gas is about +25°. The low-boiling vinyl chloride contained in the mixture of reaction gas is practically separated completely by condensation and the non-reacted gas is returned to the apparatus.

The chlorination products formed consist of:

| | Percent by weight |
|---|---|
| Vinyl chloride | 51.0 |
| Mixture of 1.1-dichlorethylene and 1.2-dichlorethylene | 11.0 |
| Higher boiling mixture of chlorinated ethanes and ethylenes | 38.0 |

The leaving gas mixture contains up to 0.3% by volume of non-reacted chlorine.

Example 6

A mixture of 75% by volume of technically pure vinyl chloride and 25% by volume of chlorine is reacted at +390° C. The inlet temperature of the fresh gas is about +25° C.

The chlorination products formed consist of:

| | Percent by weight |
|---|---|
| Mixture of 1.1-dichlorethylene and 1.2-dichlorethylene | 45.0 |
| Higher-boiling mixture of chlorinated ethanes and ethylenes | 55.0 |

Example 7

A mixture of 75% by volume of technically pure ethyl chloride and 25% by volume of chlorine is reacted at +370° C. The inlet temperature of the fresh gas is about +60° C.

The chlorination products formed consist of:

| | Percent by weight |
|---|---|
| Vinyl chloride | 8.2 |
| 1.1-dichlorethylene and 1.2-dichlorethylene | 10.8 |
| 1.1-dichlorethane | 64.0 |
| Higher-boiling mixture of chlorinated ethanes and ethylenes | 17.0 |

The leaving gas mixture contains only traces of non-reacted chlorine. Under splitting off of HCl, 15.5% by volume of the ethyl chloride used are transformed into ethylene and obtained as such. The quantity of HCl split off in the course of this procedure is thereupon to be found in the waste gas.

Example 8

A mixture of 50% by volume of technically pure ethyl chloride and 50% by volume of chlorine is reacted at +350° C. The inlet temperature of the fresh gas is about +60° C.

The chlorination products formed consist of:

| | Percent by weight |
|---|---|
| Vinyl chloride | 28.2 |
| 1.1-dichlorethylene and 1.2-dichlorethylene | 13.7 |
| 1.1-dichlorethane | 40.4 |
| Higher boiling mixture of chlorinated ethanes and ethylenes | 17.7 |

The leaving gas mixture contains up to 0.2% by volume of chlorine. Under splitting off of HCl, 20% by volume of the ethyl chloride used are transformed into ethylene and obtained as such. The amount of HCl split off during this procedure is thereupon to be found in the waste gas.

We claim:

1. In a process for the continuous preparation of alkyl chlorination products by reacting chlorine with a compound selected from the group consisting of aliphatic hydrocarbons containing 2 to 4 carbon atoms and at most one double bond, the corresponding chlorinated compounds and mixtures thereof at temperatures between about the starting temperatures of the reaction and about 500° C. without any substantial transfer of heat through the walls of the reaction chamber, the steps which comprise controlling the reaction temperature by circulating the major portion of the reacted gases within the reaction chamber substantially parallel to the walls of said reaction chamber and by mingling less than one part by volume of the gas mixture of the starting materials with 3 parts by volume of the circulating reacted gases which are at reaction temperature.

2. A process according to claim 1 wherein the gas mixture of starting materials is introduced into the reaction chamber at a temperature between about −20° C. and about the starting temperature of the reaction.

3. A process according to claim 1 wherein the reacted gas is mixed at the reaction temperature with the freshly introduced unreacted gases.

4. A process according to claim 1 wherein the reaction is carried out in the presence of an inert gas.

5. A process according to claim 1 wherein at least a part of the liquid reactants is sprayed into the reaction chamber.

6. A process according to claim 1 wherein ethane is used as starting material.

7. A process according to claim 1 wherein ethylene is used as starting material.

8. A process according to claim 1 wherein propane is used as starting material.

9. A process according to claim 1 wherein butane is used as starting material.

10. A process for the continuous preparation of alkyl chlorination products which comprises reacting chlorine with a compound selected from the group consisting of aliphatic hydrocarbons, containing 2 to 4 carbon atoms and at most one double bond, the corresponding chlorinated compounds and mixtures thereof at a temperature between about 250 to 320° C. and about 420 to 500° C. without any substantial transfer of heat through the walls of the reaction chamber, the reaction temperature being maintained by recirculating the major portion of the reactd gases within the reaction chamber substantially parallel to the walls of said reaction chamber to mingle with the unreacted gases supplied to said reaction chamber, less than 1 part by volume of the gas mixture of the starting materials being entered per 3 parts by volume of the circulating reacted gases.

11. In a process for preparing alkyl chlorination products which comprises continuously reacting chlorine with a compound selected from the group consisting of aliphatic hydrocarbons containing 2 to 4 carbon atoms and at most one double bond, the corresponding chlorinated compounds and mixtures thereof at temperatures between about the starting temperatures of the reaction and about 500° C. without any substantial transfer of heat through the walls of the reaction chamber, the steps which comprise maintaining the reaction temperature by circulating the major portion of the reacted gases substantially parallel to the walls of the reaction chamber and mingling less than one part by volume of the gas mixture of the starting materials with 3 parts by volume of the circulating reacted gases which are at reaction temperature and completing the reaction in a second stage by conducting the reacted gases which contain small amounts of unreacted gas through an auxiliary reaction chamber.

12. In a process for the continuous preparation of alkyl chlorination products by reacting chlorine with a compound selected from the group consisting of aliphatic hydrocarbons containing two to four carbon atoms and at most one double bond, the corresponding chlorinated compounds and mixtures thereof at temperatures between about the starting temperatures of the reaction and about 500° C. without any substantial transfer of heat through the walls of the reaction chamber, the steps which comprise introducing a fresh mixture of the starting materials, in the form of a jet stream, into and along the longitudinal axis of a tubular reaction zone within said chamber from an opening in the chamber remote from the tubular reaction zone and controlling the reaction temperature by circulating the major portion of the reacted gas within and substantially parallel to the walls of the reaction chamber and mingling one part by volume of the fresh mixture of the starting materials with at least three parts by volume of said reacted gas which is at reaction temperature.

References Cited in the file of this patent

UNITED STATES PATENTS

| | | |
|---|---|---|
| 2,585,469 | Johnson | Feb. 12, 1952 |
| 2,643,272 | Lacomble et al. | June 23, 1953 |
| 2,806,768 | Bender et al. | Sept. 17, 1957 |

OTHER REFERENCES

Hochst: B.I.O.S. Final Report No. 851, Item No. 22, pages 1–12 and 3. 3 sheets of drawing (only first two sheets of drawing) (Figs. 1 and 2 are needed).